(12) United States Patent
Balasubramanian

(10) Patent No.: US 9,824,194 B2
(45) Date of Patent: *Nov. 21, 2017

(54) APPLICATION SECURITY FRAMEWORK

(71) Applicant: AbbVie INC., North Chicago, IL (US)

(72) Inventor: Sembian Balasubramanian, Libertyville, IL (US)

(73) Assignee: AbbVie Inc., North Chicago, IL (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/751,779

(22) Filed: Jun. 26, 2015

(65) Prior Publication Data

US 2015/0294092 A1    Oct. 15, 2015

Related U.S. Application Data

(63) Continuation of application No. 13/721,125, filed on Dec. 20, 2012, now Pat. No. 9,098,680.

(Continued)

(51) Int. Cl.
*H04W 12/06* (2009.01)
*G06F 21/10* (2013.01)
(Continued)

(52) U.S. Cl.
CPC ............ *G06F 21/10* (2013.01); *G06F 21/105* (2013.01); *G06F 21/12* (2013.01); *G06F 21/121* (2013.01);
(Continued)

(58) Field of Classification Search
CPC ........ G06F 21/10; G06F 21/105; G06F 21/12; G06F 21/121; G06F 21/31; G06F 21/335;
(Continued)

(56) References Cited

U.S. PATENT DOCUMENTS 5,342,609 A    8/1994  Meeh et al.
6,041,412 A    3/2000  Timson et al.
(Continued)

OTHER PUBLICATIONS

Reynolds, Pamela, STIC Search Strategy Report (dated Jul. 27, 2017).*

(Continued)

*Primary Examiner* — Sharon Lynch

(57) ABSTRACT

In accordance with the teaching described herein, systems and methods are provided for providing secure access to a software application on a computing device. The software application may include a security framework having a set of predetermined security requirements. Prior to enabling access to the software application by a user, the computing device may, (i) verify installation of a device security configuration profile on the computing device, wherein the device security configuration profile certifies that the software application includes the set of predetermined security requirements, (ii) receive identifying information from the user via a user interface, (iii) verify the identifying information with an authentication server, and (iv) based on a successful verification of the identifying information, receive and store a security token. Access to the software application on the computing device may be provided for a specified period identified by the security token.

24 Claims, 8 Drawing Sheets

Related U.S. Application Data

(60) Provisional application No. 61/579,385, filed on Dec. 22, 2011, provisional application No. 61/589,528, filed on Jan. 23, 2012.

(51) Int. Cl.

| | | |
|---|---|---|
| *H04L 29/06* | (2006.01) | |
| *G06F 21/12* | (2013.01) | |
| *G06F 21/31* | (2013.01) | |
| *G06F 21/33* | (2013.01) | |
| G06F 21/30 | (2013.01) | |
| G06F 21/60 | (2013.01) | |
| G06F 21/62 | (2013.01) | |

(52) U.S. Cl.
CPC ............ *G06F 21/31* (2013.01); *G06F 21/335* (2013.01); *H04L 29/06551* (2013.01); *G06F 21/30* (2013.01); *G06F 21/60* (2013.01); *G06F 21/629* (2013.01); *G06F 2221/0735* (2013.01); *G06F 2221/0771* (2013.01); *G06F 2221/2137* (2013.01)

(58) Field of Classification Search
CPC ........ G06F 21/30; G06F 21/60; G06F 21/629; G06F 2221/0735; G06F 2221/0771; G06F 2221/2137; H04L 29/06551
See application file for complete search history.

(56) References Cited

U.S. PATENT DOCUMENTS

| | | | | |
|---|---|---|---|---|
| 6,532,542 B1 * | 3/2003 | Thomlinson | ........ | G06F 21/6245 713/167 |
| 6,584,454 B1 | 6/2003 | Hummel, Jr. et al. | | |
| 7,069,330 B1 | 6/2006 | McArdle et al. | | |
| 7,432,454 B1 | 10/2008 | Sze et al. | | |
| 7,526,516 B1 | 4/2009 | Pavlyushchik | | |
| 7,665,139 B1 | 2/2010 | Szor et al. | | |
| 8,032,409 B1 * | 10/2011 | Mikurak | ................ | G06Q 10/00 705/14.39 |
| 8,254,579 B1 | 8/2012 | Morgan et al. | | |
| 8,667,299 B2 * | 3/2014 | Risan | ...................... | G06F 21/10 713/189 |
| 8,688,583 B2 * | 4/2014 | Boccon-Gibod | ....... | G06F 21/10 705/50 |
| 8,719,586 B1 * | 5/2014 | Paleja | ................... | G06F 21/121 705/57 |
| 8,914,906 B2 * | 12/2014 | Raley | ...................... | G06F 21/10 713/193 |
| 8,973,160 B2 * | 3/2015 | Manning | ................. | G06F 21/10 726/1 |
| 9,147,085 B2 * | 9/2015 | Bender | ................. | G06F 21/629 |
| 9,491,215 B2 * | 11/2016 | Manning | ................. | G06F 21/10 |
| 2002/0031230 A1 * | 3/2002 | Sweet | ................... | H04L 63/0428 380/278 |
| 2002/0108050 A1 * | 8/2002 | Raley | ...................... | G06F 21/10 713/193 |
| 2003/0061482 A1 * | 3/2003 | Emmerichs | ........... | G06F 21/604 713/165 |
| 2003/0069757 A1 | 4/2003 | Greenberg | | |
| 2003/0177400 A1 * | 9/2003 | Raley | ...................... | G06F 21/10 713/168 |
| 2003/0196091 A1 * | 10/2003 | Raley | ...................... | G06F 21/10 713/176 |
| 2003/0196092 A1 * | 10/2003 | Raley | ...................... | G06F 21/10 713/176 |
| 2003/0196093 A1 * | 10/2003 | Raley | ...................... | G06F 21/10 713/176 |
| 2003/0196109 A1 * | 10/2003 | Raley | ...................... | G06F 21/10 726/29 |
| 2003/0196119 A1 * | 10/2003 | Raley | ...................... | G06F 21/10 726/7 |
| 2003/0196120 A1 * | 10/2003 | Raley | ...................... | G06F 21/10 726/21 |
| 2003/0196121 A1 * | 10/2003 | Raley | ...................... | G06F 21/10 726/21 |
| 2003/0200172 A1 | 10/2003 | Randle et al. | | |
| 2003/0200468 A1 * | 10/2003 | Raley | ...................... | G06F 21/10 726/26 |
| 2003/0204753 A1 * | 10/2003 | Raley | ...................... | G06F 21/10 726/28 |
| 2004/0075697 A1 | 4/2004 | Maudlin | | |
| 2004/0153257 A1 | 8/2004 | Munk | | |
| 2005/0138386 A1 | 6/2005 | Le Saint | | |
| 2005/0177742 A1 * | 8/2005 | Benson | .................... | G06F 21/10 713/189 |
| 2005/0216639 A1 | 9/2005 | Sparer et al. | | |
| 2005/0222503 A1 | 10/2005 | Dunlop et al. | | |
| 2005/0278793 A1 * | 12/2005 | Raley | ...................... | G06F 21/10 726/28 |
| 2006/0015740 A1 | 1/2006 | Kramer | | |
| 2006/0101408 A1 | 5/2006 | Kotamarthi et al. | | |
| 2006/0133362 A1 | 6/2006 | Stein et al. | | |
| 2006/0200856 A1 | 9/2006 | Salowey et al. | | |
| 2007/0006323 A1 | 1/2007 | Verbowski et al. | | |
| 2007/0204167 A1 | 8/2007 | Beker et al. | | |
| 2007/0208834 A1 | 9/2007 | Nanamura et al. | | |
| 2008/0005426 A1 * | 1/2008 | Bacastow | ............... | G06F 21/78 710/62 |
| 2008/0027602 A1 | 1/2008 | Yeap et al. | | |
| 2008/0039778 A1 | 2/2008 | Goldie et al. | | |
| 2008/0040151 A1 | 2/2008 | Moore | | |
| 2008/0127343 A1 | 5/2008 | Baker et al. | | |
| 2008/0134347 A1 * | 6/2008 | Goyal | .................. | G06F 21/6209 726/29 |
| 2009/0025074 A1 | 1/2009 | Le Saint et al. | | |
| 2009/0116643 A1 | 5/2009 | Hatano et al. | | |
| 2009/0222902 A1 * | 9/2009 | Bender | ............... | H04L 63/0823 726/10 |
| 2010/0242097 A1 | 9/2010 | Hotes et al. | | |
| 2010/0299719 A1 * | 11/2010 | Burks | ................ | G06F 9/44505 726/3 |
| 2011/0035740 A1 | 2/2011 | Powell et al. | | |
| 2011/0058719 A1 | 3/2011 | Trzasko et al. | | |
| 2011/0107437 A1 * | 5/2011 | Goyal | .................. | G06F 21/6209 726/30 |
| 2011/0154215 A1 * | 6/2011 | Raley | ...................... | G06F 21/10 715/744 |
| 2011/0173701 A1 * | 7/2011 | Raley | ...................... | G06F 21/10 726/26 |
| 2011/0190581 A1 | 8/2011 | Bennett et al. | | |
| 2011/0225417 A1 * | 9/2011 | Maharajh | ................ | G06F 21/10 713/150 |
| 2011/0252240 A1 * | 10/2011 | Freedman | ............... | H04L 63/02 713/169 |
| 2011/0272481 A1 | 11/2011 | Mullen et al. | | |
| 2011/0296175 A1 | 12/2011 | Shin | | |
| 2012/0046012 A1 | 2/2012 | Forutanpour et al. | | |
| 2012/0047425 A1 | 2/2012 | Ahmed | | |
| 2012/0107380 A1 | 5/2012 | Tuinstra et al. | | |
| 2012/0215780 A1 | 8/2012 | Faitelson et al. | | |
| 2012/0304302 A1 * | 11/2012 | Stecher | ................... | G06F 21/84 726/26 |
| 2012/0311675 A1 * | 12/2012 | Ham | ........................ | G06F 8/61 726/4 |
| 2013/0054962 A1 * | 2/2013 | Chawla | ................ | H04L 9/321 713/156 |
| 2013/0133085 A1 | 5/2013 | Tsujimoto | | |
| 2013/0247166 A1 * | 9/2013 | Freedman | ............... | H04L 63/02 726/10 |
| 2013/0276067 A1 * | 10/2013 | Goyal | .................. | G06F 21/6209 726/4 |
| 2013/0346745 A1 * | 12/2013 | Broch | .................... | H04L 9/3263 713/156 |
| 2014/0173749 A1 * | 6/2014 | Raley | ...................... | G06F 21/10 726/27 |
| 2015/0074830 A1 * | 3/2015 | Raley | ...................... | G06F 21/10 726/28 |

(56) References Cited

U.S. PATENT DOCUMENTS

| | | | | |
|---|---|---|---|---|
| 2015/0126172 A1* | 5/2015 | Burks | ................ | G06F 9/44505 |
| | | | | 455/418 |
| 2015/0237498 A1* | 8/2015 | Freedman | ............... | H04W 8/22 |
| | | | | 455/419 |
| 2015/0294092 A1* | 10/2015 | Balasubramanian | ... | G06F 21/10 |
| | | | | 726/28 |
| 2016/0057002 A1* | 2/2016 | Burks | ................ | G06F 9/44505 |
| | | | | 455/418 |
| 2016/0164686 A1* | 6/2016 | Broch | .................. | H04L 9/3263 |
| | | | | 713/175 |

OTHER PUBLICATIONS

Extended European Search Report dated Aug. 12, 2015; AbbVie Inc. Application No. PCT/US2012070762, 9 pages.
Lopes et al., "Application H-Secure for Mobile Security," 2014, IEEE, p. 370-374.
Mariyappan et al., "Power Draining Prevention in Ad-Hoc Sensor Networks Using Sensor Network Encryption Protocol," 2014, IEEE, p. 1-5.
Moran et al., "Security for Mobile ATE Applications," 2012, IEEE, p. 204-208.
Sharp et al., "Extending Hardware Based Mandatory Access Controls for Memory to Multicore Architectures," May 2008, ACM, p. 1-3.
PCT/US2012/070762, Notification Concerning Transmittal of International Preliminary Report on Patentability, dated Jul. 3, 2014.
PCT/US2012/70762 filed Dec. 20, 2012, Notification of Transmittal of the International Search Report and Written Opinion of the International Searching Authority, dated Mar. 12, 2013.

* cited by examiner

APPLICATION SECURITY FRAMEWORK

CROSS-REFERENCE TO RELATED APPLICATIONS

This application is a continuation of U.S. patent application Ser. No. 13/721,125, filed Dec. 20, 2012, which claims priority from the following two U.S. Provisional Patent Applications: U.S. Provisional Patent Application No. 61/579,385, filed on Dec. 22, 2011 and titled "Mobile Security Framework", and U.S. Provisional Patent Application No. 61/589,528, filed on Jan. 23, 2012 and titled "Application Security Framework," all of which are incorporated herein by reference in their entirety.

FIELD

The technology described in this patent document relates generally to security for software applications. More particularly, systems and methods are described for providing a security framework for developing or modifying a software application to include a preconfigured set of security features.

BACKGROUND

Security measures for controlling access to software are often critical in today's environment. This is particularly true for software systems that provide access to sensitive or confidential information. It may therefore be desirable to provide a security framework for providing secure access to software applications.

SUMMARY

In accordance with the teaching described herein, systems and methods are provided for providing secure access to a software application on a computing device. The software application may include a security framework having a set of predetermined security requirements. Prior to enabling access to the software applications by a user, the computing device may, (i) verify installation of a device security configuration profile on the computing device, wherein the device security configuration profile certifies that the software application includes the set of predetermined security requirements, (ii) receive identifying information from the user via a user interface, (iii) verify the identifying information with an authentication server, and (iv) based on a successful verification of the identifying information, receive and store a security token. Access to the software application on the computing device may be provided for a specified period identified by the security token.

DETAILED DESCRIPTION

Figure 1:
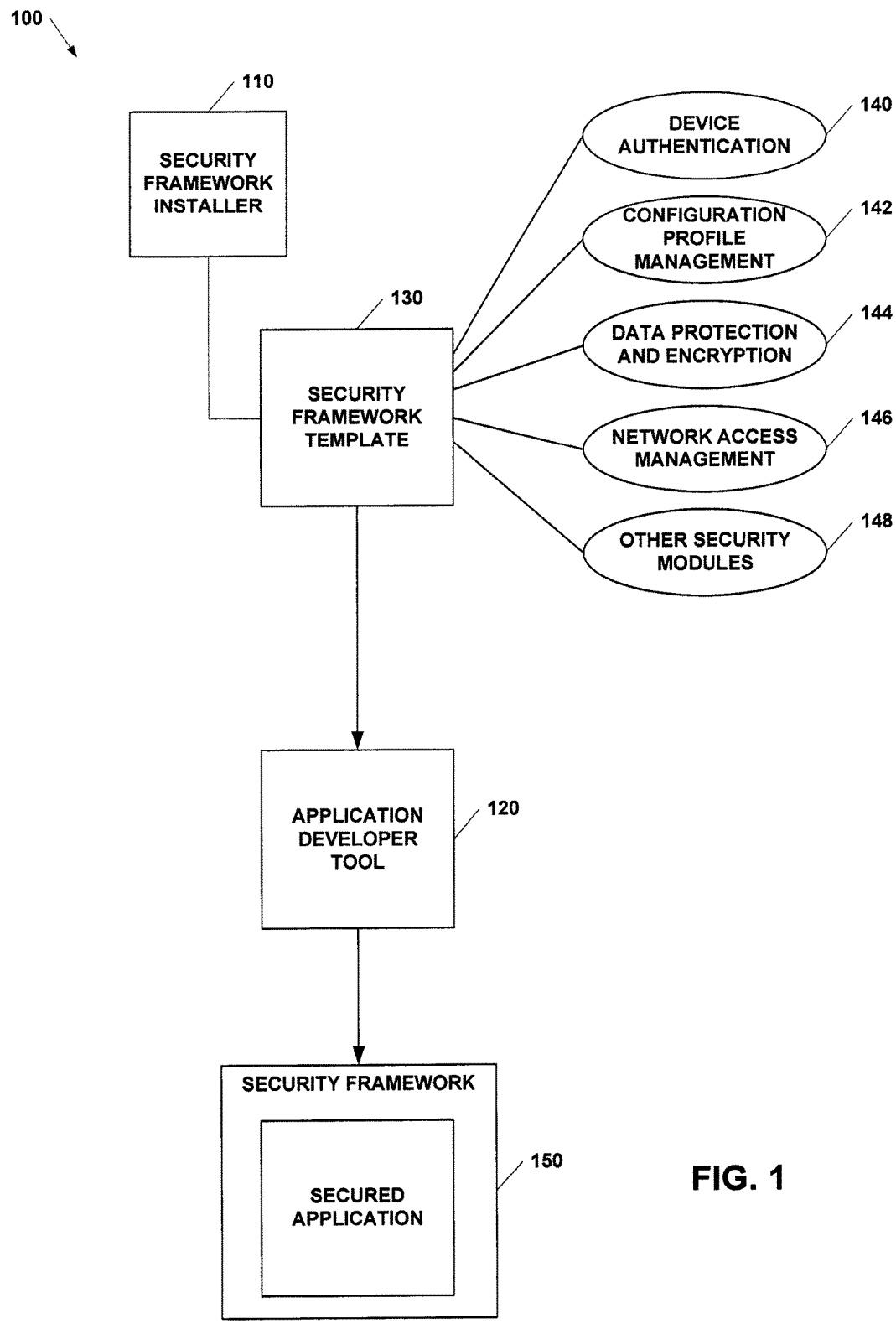
FIG. 1 is a block diagram of an example system and method for developing a secured software application.

FIG. 1 is a block diagram of an example system and method 100 for developing a secured software application. The system 100 may be used to develop a software application having a predetermined set of security features for installation on a computing device, such as a tablet computer, laptop computer, PDA, special-purpose computing device (e.g., a software driven medical device), or some other type of device having a processor for executing software applications.

The system 100 includes a security framework installer 110 and an application developer tool 120, which may be software applications that are stored in one or more memory devices and are executed by one or more processors (e.g., using a laptop or desktop computer.) The system also includes a security framework template 130 that is created and stored by the security framework installer 110 and that includes a plurality of security modules 140-148. In operation, the security framework template 130 is retrieved by the application developer tool 120 in order to include the predefined security modules 140-148 in a software application under development, ultimately resulting in a secured application 150 that is protected by the security framework defined in the template.

The security framework installer 110 is used to combine the plurality of pre-developed security modules 140-148 into a security framework template 130 and store the framework 130 to a file for access by the application developer tool 120. The security framework template 130 may, for example, be in the form of a project template that is specific to a particular application developer tool. For instance, in one embodiment the application developer tool 120 may be a version of the Xcode developer tool provided by Apple Inc. of Cupertino, Calif. for developing software applications for their Mac, iPhone and iPad products, and the security framework template 130 may be in the form of an Xcode project template. The security framework installer 110 may, for example, be used to create the skeleton for a new software development project (e.g., an Xcode project) that includes a predetermined set of security modules 140-148. For example, in certain embodiments, the security framework installer 110 may automatically include security modules within the framework 130 that have been predetermined as being essential in order for the new application to meet certain security regulations or guidelines. In addition, the security modules 140-148 may be standardized for use with different types of software applications and different types of computing devices, for instance using standardized application programming interfaces (APIs).

As illustrated, the security modules included within the security framework template 130 may include a device authentication module 140, a configuration profile management module 142, a data protection and encryption module 144, a network access management module 146, and/or other security modules 148. It should be understood that a security module (140-148) may include software code (e.g., class files or other software routines), configuration files, and/or other types of software instructions or data for use by the application 150 in implementing certain security features.

The device authentication module 140 may, for example, include software instructions and/or data for use by the secured application 150 in accessing an authentication server to verify a user's identity and negotiate a security token for accessing the application 150. The device authentication module 140 may include software instructions (e.g., class files) for receiving password information from a user and transmitting an authentication request message over one or more networks to an authentication server. An authentication request message may include the password information along with a username and/or other information for identifying the user and/or a particular device on which the software application is executing.

The device authentication module 140 may further include software instructions for receiving and managing a security token from the authentication server and for using the security token to restrict access to the secured application 150 and any application data. For instance, the device authentication module 140 may require the user to provide username and password information and successfully negotiate a security token with an authentication server before any access is provided to the secured application 150 or stored application data. The device authentication module 140 may also monitor any expiration information associated with a negotiated security token and prevent further access to the application 150 and any associated application data after the security token has expired. An example operation of the device authentication module 140, including an example of how a security token may be negotiated and managed, is described below in more detail with reference to FIG. 4.

The configuration profile management module 142 may include software instructions and/or data for use by the secured application 150 in monitoring the security settings of a device on which application is installed. For instance, the security framework 130 may require that the device operating the secured application 150 have certain predetermined security settings enabled, such as a screen lock period coupled with password protection. The configuration profile management module 142 may be configured to monitor the security configuration of the device and prevent access to the secured application and any associated application data if the required security configuration is not enabled on the device. An example of how the security configuration for a device operating the secured application 150 may be installed and monitored is described below in more detail with reference to FIG. 3.

The data protection and encryption module 144 may include software instructions and/or data for protecting the transmission and storage of application data and/or other information associated with the secured application 150. For instance, the data protection and encryption module 144 may provide or require the use of data encryption algorithms, such as AES 256 bit encryption, for encrypting any data that is stored by the secured application 150 or that is transmitted over a network by the secured application 150. The data protection and encryption module 144 may also be used to create one or more secure data storage locations (e.g., document folders) for the secured application 150 and to manage access to any secure stored data. Application data and/or other information stored in a protected data storage location may, for example, be both encrypted and protected using the highest level of data protection available on the particular device.

In addition, the data protection and encryption module 144 may interact with other security modules, such as the device authentication 140 and configuration profile management module 142, to determine if and when access to protected data is allowed. Protected data access may, for example, be permitted only once a valid security token has been negotiated by the device authentication module 140 and a valid device security configuration has been verified by the configuration profile management module 142. The data protection and encryption module 144 may also cut off all access to protected data if it is determined that the security token has expired or if any unauthorized change is made to the device security configuration. In one embodiment, any protected data may be deleted if it is determined that a device security profile has been removed or otherwise modified. A further example of how application data and other related information may be protected by the data protection and encryption module 144 is described below with reference to FIG. 4.

The network access management module 146 may include software instructions and/or data for controlling network access by the secured application 150. For instance, the network access management module 146 may require that the secured application 150 use a secure cryptographic protocol, such as SSL or TLS, for any communications over a wired or wireless network. Any network communications to or from the secured application that are not encrypted with an authorized cryptographic protocol may be blocked by the network access management module 146. For instance, the module 146 may permit only HTTPS traffic by the secured application 150. In addition, the network access management module 146 may enforce other restrictions on which network locations may be accessed and how data may be transmitted over a network. For instance, a valid digital certificate (e.g., SSL certificate) may be required from any network site accessed by the secured application 150, and online content hosting for the application 150 may be restricted to a single secure online source. The network access management module 146 may also interface with the data protection and encryption module 144 to ensure that any downloaded data is immediately protected. A further example of how the network access management module 144 may protect against unsecure network access is described below with reference to FIG. 4.

The security framework template 130 may also include one or more other security modules 148. For instance, in certain embodiments, the template 130 may include a security token module for managing and protecting access to one or more security tokens and/or other user—or application—related information. In one example, a security token module may enable the use of a single negotiated security token for multiple secured applications 150 that include the same security framework.

Figure 2:
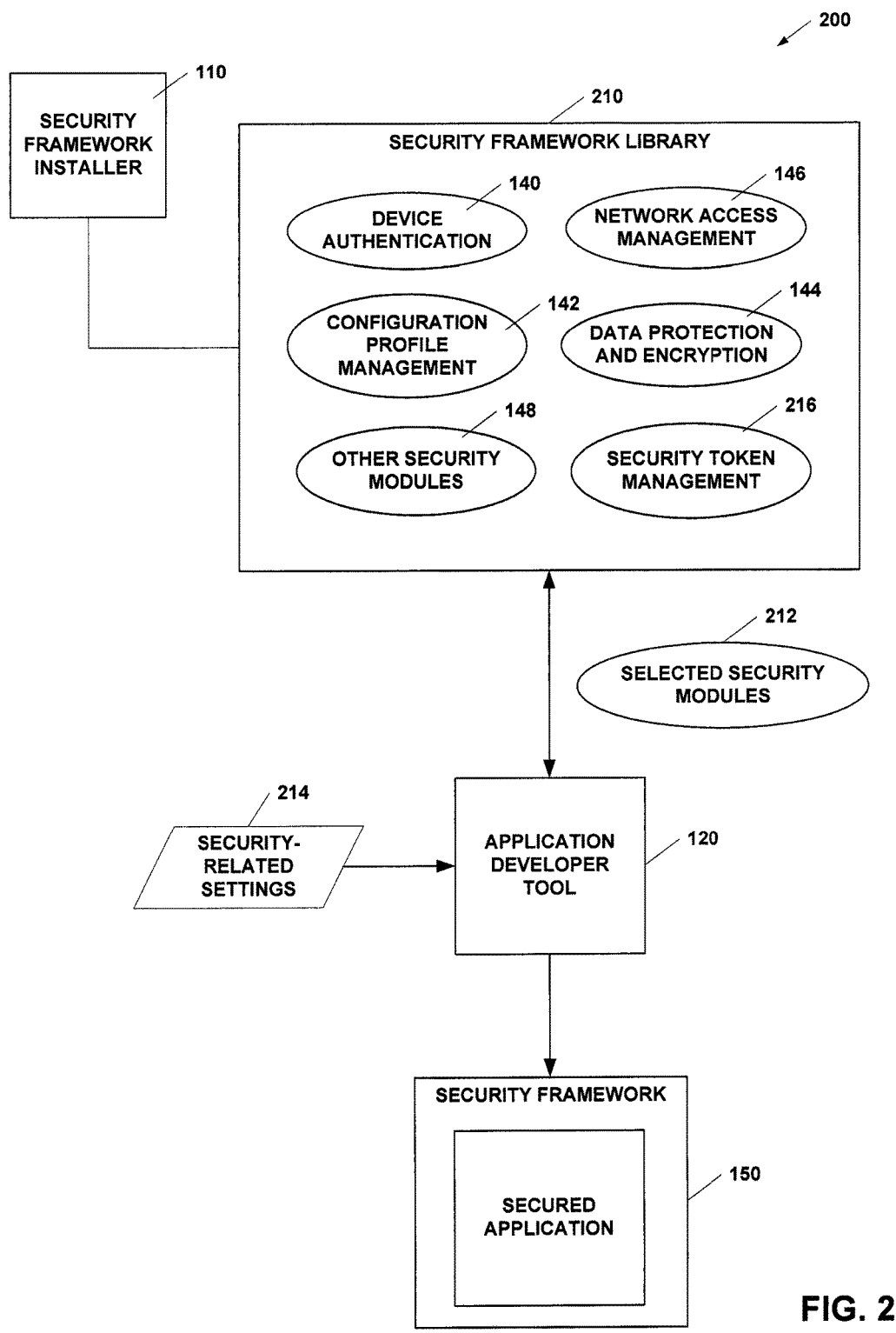
FIG. 2 is a block diagram of another example system and method for developing a secured software application.

FIG. 2 is a block diagram of another example system and method 200 for developing a secured software application. In this example 200, the security framework installer 110 stores the security modules 140-148, 216 in a security framework library 210 for access by the application developer tool 120. Instead of providing the application developer tool 120 with a template that includes all of the security modules necessary to satisfy the applicable security regulations or guidelines, this embodiment requires the desired security modules 212 to be manually selected from the library 210 by the application developer tool 120. In addition, other necessary security-related settings 214 that may be provided by the security framework template 130 of FIG. 1 may be manually entered to the application developer tool 120 in this embodiment.

The manual-selection embodiment 200 depicted in FIG. 2 may be particularly useful for modifying an existing application to add the security framework. That is, when developing a secured application 150 from scratch, the security framework template 130 of FIG. 1 provides a convenient way to ensure that a preselected set of security modules 140-148 are properly incorporated into the new application. But when modifying an existing application to add the preselected set of security modules 140-148, it may not be feasible to utilize an application developer framework. Accordingly, in certain embodiments, the security framework installer 110 may provide the preselected set of security modules 140-148 both in the form of a security framework template 130, as illustrated in FIG. 1, and in a security framework library 210, as illustrated in FIG. 2. In this way, the user may incorporate the security modules 140-148 in a manner that is most suitable to the particular application being developed or modified.

In addition, the security framework library 210 may also include one or more security modules that are not included in the security framework template. For instance, in the illustrated example, the security framework library 210 includes a security token management module 216 in addition to the security modules 140-148 included in the security framework of FIG. 1. The additional security module(s) 216 may, for example, include a security module(s) that is available for inclusion in the security framework by the application developer tool, but that is not an essential module in accordance with a predetermined set of security guidelines or regulations. For instance, the security token management module 216 may include software instructions that are configured to provide access to a single negotiated security token by multiple applications that share the same security framework, as described below in more detail with reference to FIG. 4.

In one example embodiment, the security framework installer 110 may provide both a security framework template 130, as shown in FIG. 1, and a security framework library 210, as shown in FIG. 2. In this manner, the application developer tool 120 may take advantage of the security framework template 130 to provide the essential framework for a new application. In addition, the security framework 210 may also be accessed by the application developer tool 120 to add any additional security modules, such as the security token management module 216, that may not be included in the security framework template 130.

Figure 3:
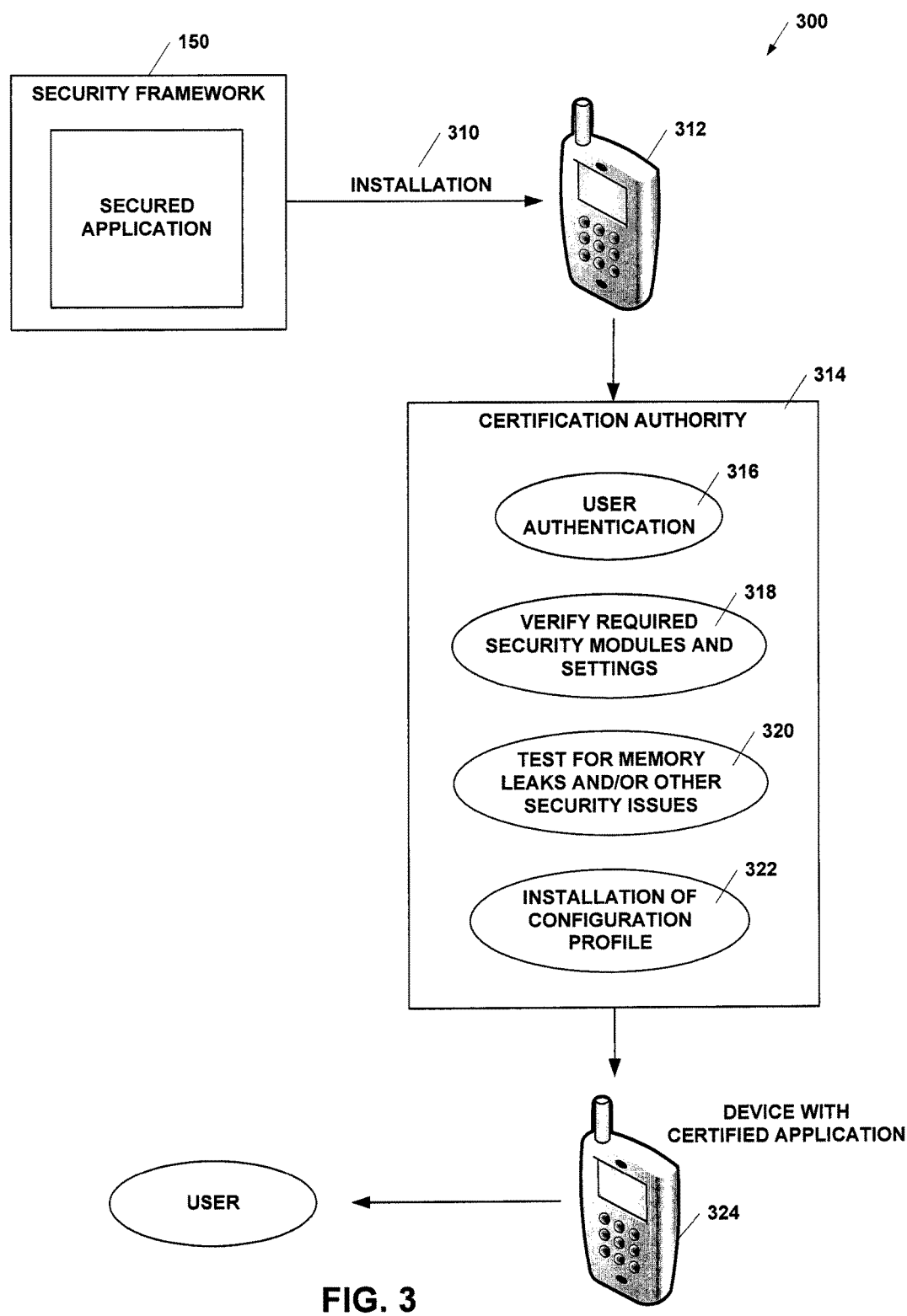
FIG. 3 is a block diagram depicting a system and method for verifying proper installation of a security framework and certifying a secured application for operation.

FIG. 3 is a block diagram depicting a system and method 300 for verifying proper installation of a security framework and certifying a secured application for operation. As shown at reference 310, the secured application 150 having a predefined security framework may be installed on a computing device 312, such as a tablet computer, laptop computer, PDA, special-purpose computing device (e.g., a software driven medical device), or some other type of device having a processor for executing software applications. The device 312 with the installed application 150 is then sent to a certification authority 314 for verification, testing and installation of a device security configuration profile.

The certification authority 314 may perform one or more user authentication operations 316 to verify the identity of the device user and/or the user's authorization to access the secured application 150. For instance, in certain embodiments access to the secured application 150 may be restricted to select employees, licensed customers, or some other limited group of people. The certification authority 314 may authenticate the user by verifying some type of identification and/or authorization information, such as an employee identification number, a product license number, a photo identification, or some other suitable type of information.

In addition, the certification authority 314 verifies that the installed application includes a security framework with a predetermined set of security modules and/or settings (as shown at reference 318). For instance, the certification authority 314 may require that certain security features or settings be included in the application 150 before access to the application 150 is authorized on the device 312. In certain embodiments, the certification authority 314 may not only require certain security features or settings, but may also require that particular pre-approved software instructions (e.g., security modules) be used to implement the required security features. In this way, the certification authority can ensure compliance by the application 150 with a predetermined set of security guidelines or regulations. In addition, the certification authority 314 may ensure that access to the source code is protected, for example by requiring that core functionalities and security functions are implemented as protected classes.

In addition to verifying the required security modules and source code security, the certification authority 314 may also test the application 150 for known security risks. For example, the certification authority 314 may test for memory leaks from the secured application 150, viruses or other malware infecting the application 150 or device 312, and/or other problems with the application that may raise security concerns.

If the certification authority 314 determines that all of its security guidelines and tests have been satisfied, then a configuration profile is installed on the device (as shown at reference 322.) The configuration profile provides security restrictions for the device 312 on which the secured application 150 is installed. For example, the configuration profile may require that device password and screen lock settings be enabled on the device. In addition, the configuration profile may be signed by the certification authority 314 and stored on the device 312 in a way that any attempt to remove or modify the configuration profile may be detected by the application security framework. Once the configuration profile has been installed, the certified device 324 is returned to the user and may be used to access the secured application 150, as described in more detail below with reference to FIG. 4.

The certification authority 314 may, for example, be an entity associated with the device user, such as an employer, or may be a third-party entity that has an interest in maintaining integrity of the secured software application 150. For example, the function of the certification authority 314 could be performed by the employer of the device user to ensure that confidential information is protected on a portable computing device issued to the device user. In another example, as described in more detail below with reference to FIG. 6, the function of the certification authority may be performed by a software developer to ensure that a controlled copy of the software is utilized by the end user.

In alternative embodiments, the functions of the certification authority 314 could be performed remotely, for example by a certification authority (CA) server, without the certificate authority having to take physical possession of the device. For instance, in certain embodiments the secured application 150 could be transmitted over a network to a CA server, which verifies that the security framework meets a set of predetermined guidelines and tests the application 150 for any additional security issues (e.g., memory leaks, viruses, etc.) If the security of the application 150 is successfully verified by the CA server, then a configuration profile may be provided for download from the CA server and installation on the device.

Figure 4:
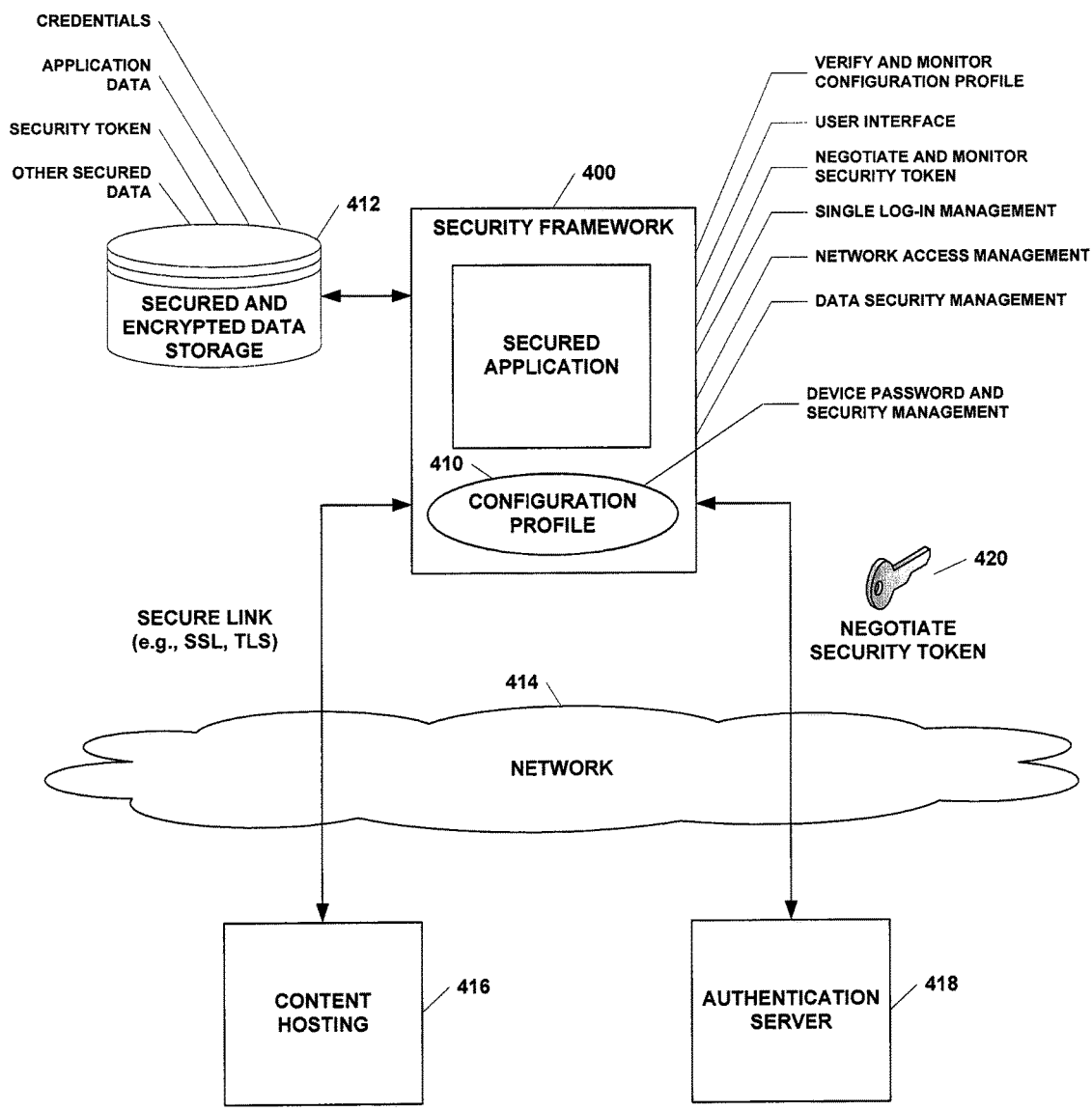
FIG. 4 is a block diagram that depicts an example operation of a secured application that has been certified by a certification authority and installed on a computing device.

FIG. 4 is a block diagram that depicts an example operation of a secured application that has been certified by a certification authority and installed on a computing device. The example illustrates a secured application 400 that has been installed on a computing device (not shown) along with a configuration profile 410 from the certification authority. The secured application 400 has access to one or more data storage locations 412, such as document folders, located on the computing device (not shown.) In addition, the secured application 400 has access to a computer network 414, which may include a wired network (e.g., the Internet), a wireless network, or a combination of wired and wireless networks. Via the network 414, the secured application 400 has access to an authentication server 416, and may also have access to one or more content hosting locations 418.

In operation, when the secured application 400 is executed, and before the user is provided with access to the application or associated data, the security framework 400 verifies that the device includes a valid configuration profile 410. This may include verifying that a configuration profile 410 is currently stored in an appropriate location on the device, verifying that the configuration profile 410 includes a valid digital signature from the certification authority, verifying that that configuration profile 410 has not been modified, and/or verifying that an expiration period for the configuration profile 410 has not expired. In addition, the security framework 400 may continue monitoring the configuration profile 410 and disable access to the secured application 400 and any associated data 412 if the configuration profile 410 is removed or modified. In one embodiment, the security framework 400 may delete stored application data if it is determined that the configuration profile 410 has been removed or modified in order to prevent unauthorized access to the stored data.

Once the configuration profile 510 has been verified, the security framework 400 provides a user interface for receiving identifying information from the device user, such as a username and password. In certain embodiments, the security framework 400 may be configured to mask the user interface such that the identifying information cannot be viewed or intercepted by a third party. For instance, the security framework 400 may cause the user interface to display an asterisk or some other character in place of the username and/or password characters that are input by the user. In addition, the security framework 400 may prevent the user interface from being displayed on a peripheral device, such as a projection device.

The identifying information received from the device user is then transmitted over a network 414 to the authentication server 418 for verification. If the identifying information is verified, the authentication server 418 generates a security token 420 that is encrypted and returned over the network 414 to provide authorization for accessing the secured application 400. The authentication server 418 may, for example, be a domain controller server that employs an Active Directory (AD) service for verifying the identifying information (e.g., username and password) and creating the security token 420. The security token 420 may, for example, be a Security Assertion Markup Language (SAML) 2.0 token, which is an XML-based protocol for exchanging authentication information and authorization data over a network 414. It should be understood, however, that in other embodiments some other type of security token, session key or other authentication mechanism may be utilized to authenticate the user and provide authorization for accessing the secured application 400 based on a successful authentication.

The security token 420, once received from the authentication server 418, is stored in a secure location 412 on the device and is used by the security framework 400 to grant access to the secured application 400 for a specified period. The security token 420 may include information identifying an expiration period, after which a new security token must be negotiated with the authentication server 418 in order to continue access to the secured application 400. The security framework 400 may, for example, continuously monitor (e.g., at predetermined intervals) the stored security token and discontinue access to the secured application 400 once the security token has expired. For instance, upon expiration of the security token, the security framework 400 may cause the user interface to be displayed in order to receive identifying information (e.g., a user name and password) from the user and negotiate a new security token 420 from the authentication server 418. In addition, the security token 420 may also be used to provide other information for use by the secured application 400.

In one embodiment, a single security token 420 may be used to provide access to multiple secured applications for a specified period. For example, the security token 420 may be stored in a common secure file location for use in granting access to multiple secured applications that include the same security framework. In one example, the security token 420 could be stored in a keychain file that is managed by the Keychain password management system included in certain versions of the MAC Operating system provided by Apple, Inc. of Cupertino, Calif. In this manner, a device user would only be required to log-in with the authentication server 418 once in order to gain access to multiple secured applications for as long as the single security token remains valid (e.g., until expiration of the token.) In addition, logging out or invalidation of a session in one of the secured applications may result in invalidation of all of the multiple secured applications within the security framework.

After verification of the configuration profile 410 and a successful log-in with the authentication server 418, the user may operate the secured application 400 on the device. During operation of the application 400, the security framework 400 is used to provide and enforce certain security restrictions on the transmission and storage of data. The security framework 400 may, for example, enforce certain restrictions on how data may be transmitted and received over a network 414 and what type of on-line resources may be utilized by the secured application 400. For instance, the security framework 400 may require that all online traffic to and from the secured application be encrypted using an authorized protocol, such as SSL or TLS. The security framework 400 may also only permit access to certified network locations, such as websites or servers having a valid digital certificate, such as an SSL certificate. In other examples, network access by the secured application 400 may be restricted to locations (e.g., content hosting servers or websites) that have been evaluated and preapproved, for example by the certification authority. Other network access restrictions may also be enforced by the security framework 400, such as limiting content hosting for the application 400 to service from a single secure online source.

The security framework 400 may also ensure that data associated with the secured application 400 is encrypted and maintained in a secure storage location 412. For example, the security framework 400 may require that all application data be encrypted using a preapproved encryption algorithm (e.g., AES 256) and stored in one or more secure document folders 412 that are protected at the highest available level of data protection available by the device operating system. The security framework 400 may also require that the secure storage location 412 be protected using hardware-based encryption. In addition to protecting application-generated data, the security framework 400 may also require that any data downloaded over the network 414 by the secured application 400 be immediately encryted and stored in the one or more secure document folders 412.

In certain examples, the security framework 400 may also permit access to and secure offline resources in the computing device after a successful login. The credentials of the offline data may then be verified when the device comes back online to validate the user credentials based on authentication server response.

The security framework 400 may continuously monitor (e.g., at predefined intervals) the secure document folders 412 for unauthorized access and/or other security breaches. If the security framework 400 determines that a security requirement has been breached, it may disable all access to the protected data 412, for example by deleting all files in the protected data locations 412. For instance, data in the protected storage location 412 may be automatically deleted by the security framework 400 if a data protection policy is modified, if the device configuration profile 410 is removed or modified, and/or if some other type of potential security breach is detected. In one example, the security framework may also delete protected data 412 upon expiration of the security token.

Figure 5:
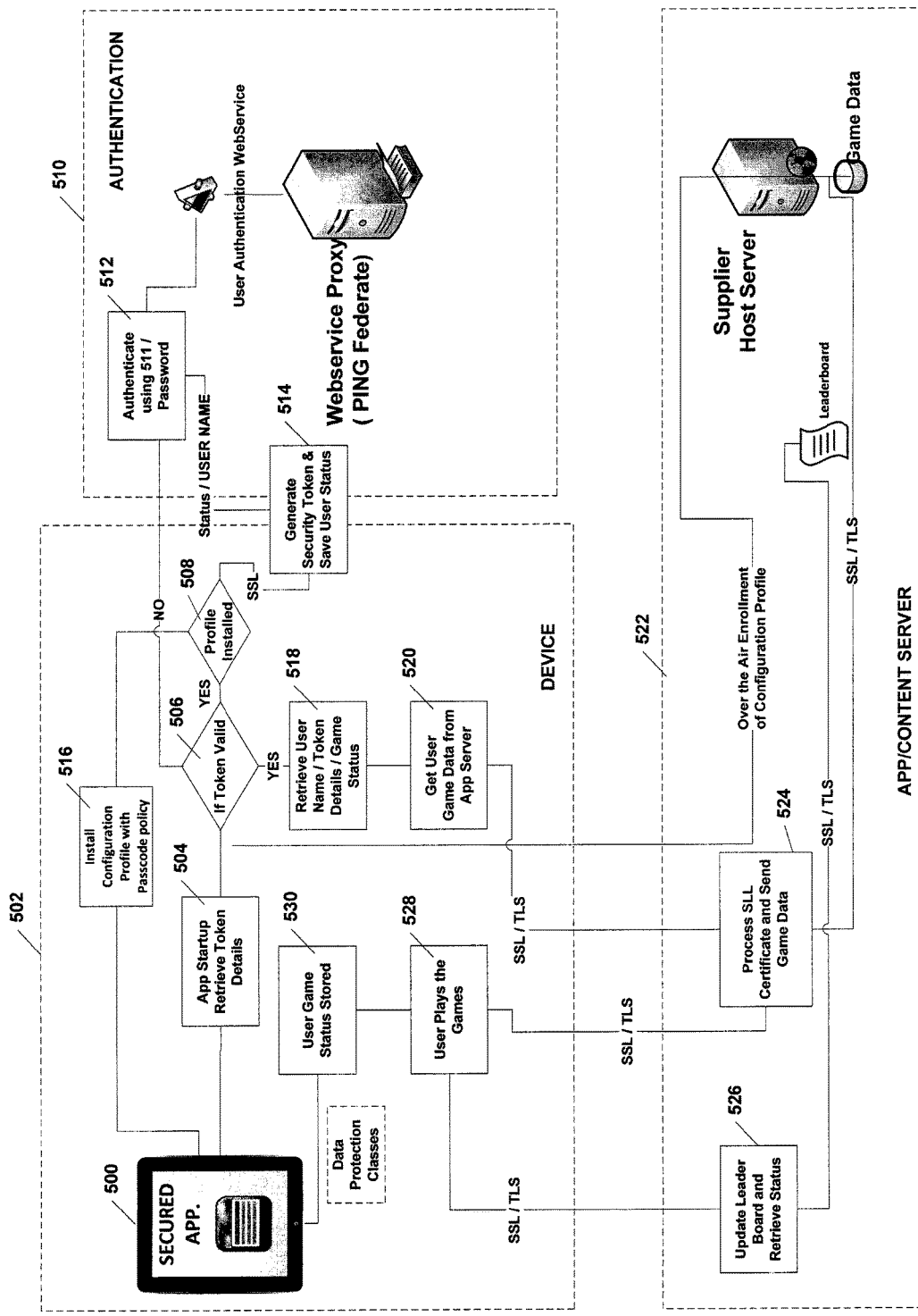
FIG. 5 is a flow diagram illustrating the operation of an example that is secured using the security framework described herein.

FIG. 5 is a flow diagram illustrating the operation of an example application that is secured using the security framework described herein. In this example, a secured application 500 for playing a game is installed on a computing device 502, such as a tablet computer, PDA, laptop computer, etc. When the application 500 is launched, at step 504, the security framework looks to a storage location (e.g., a keychain file) for an existing security token. At step 506, the security framework determines if a valid security token is already stored on the device (e.g., because the security token was previously negotiated and has not yet expired.) If a valid security token is located, then the security framework proceeds to step 508. Otherwise, if no security token is found, or if the security token has expired, identifying information (e.g., a username and password) is received from the device user and transmitted over a network to an authentication token is found, or if the security token has expired, identifying information (e.g., a username and password) is received from the device user and transmitted over a network to an authentication server 510 at step 512. If the identifying information is verified by the authentication server, then a security token is generated and stored in a secure location on the device at step 514, after which the process returns to step 508.

At step 508, the security framework determines if a valid device configuration profile is stored on the device. If not, then a configuration profile must be installed by the certificate authority (step 516) before access to the application 500 is permitted. Once a valid security token and a valid configuration profile have been verified, the main application files and processes may be accessed by the user, beginning at step 518 in the illustrated example.

At step 518, the application retrieves the user name, which may be stored as part of the security token, and the game data from a secured storage location associated with the application 500. Then, at step 520, the application 500 connects over a secure link (e.g., SSL or TLS) with a content server 522 to retrieve online game data, such as leader board information. Before access is permitted to the content server 522, however, the security framework first verifies, at step 524, that the server has a valid digital certificate and/or that online access to the content server 522 is otherwise permitted by the network security policies of the security framework. Once access to the content server is granted, the online game data is downloaded over the network at step 526.

The game application 500 is played by the user at step 528, during which time the application 500 may securely access data from the content server 522 and store application data, such as the game status, in a protected, document file associated with the secured, application 500, as shown in step 530. The user may then continue playing the game (at step 528), without further authentication for so long as the security token remains valid (e.g., until the end of a token expiration period.)

Figure 6:
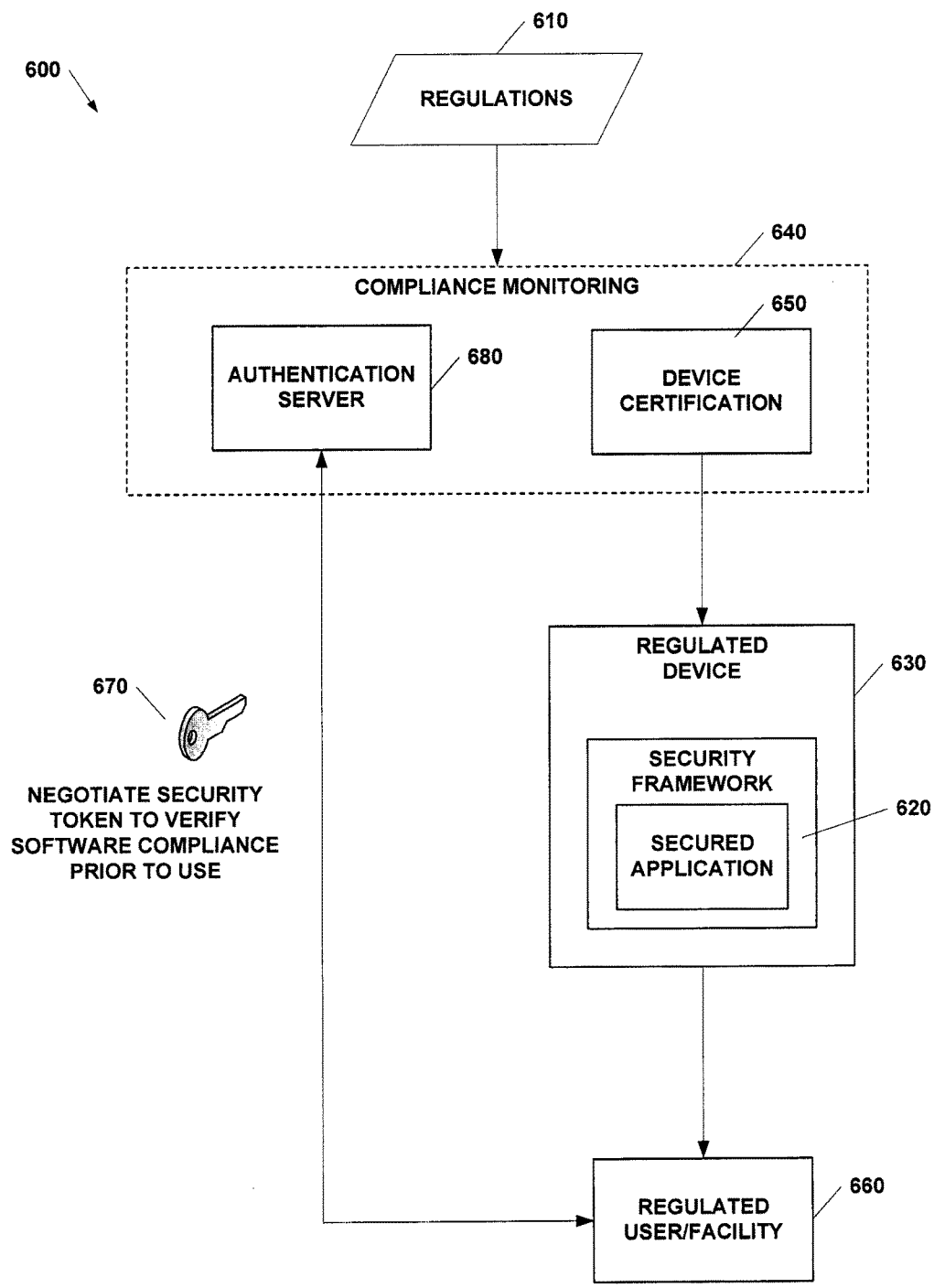
FIG. 6 is a diagram illustrating another example application of the security famework described herein.

FIG. 6 is a diagram illustrating another example application of the security framework described herein. In this example 600, the security framework and verification procedures are used to ensure that the secured software application remains compliant with a set of regulations 610. As illustrated, the secured application 620 may be installed on a device 630 that is subject to certain regulations 610. For instance, in one embodiment, the secured application 620 may be installed on a medical device 620 that is subject to FDA regulation.

The set of regulations 610 relating to operation of the device 630 may be received by a compliance monitoring authority 640, which may for example be the manufacturer and/or distributor of the regulated device 630. To certify that the secured software application 620 has been correctly installed with a valid security framework, the compliance monitoring authority 640 may include a device certification entity 650 that verifies and tests the application 620 on the device and then installs a device configuration profile (e.g., as described above with reference to FIG. 3.) The regulated device 630 with the installed application 620 and configuration profile may then be provided to the user 660. For instance, in the example of a regulated medical device subject to FDA regulation, the device 630 may be provided to a physician or medical facility for use on patients.

To ensure authorized use of the secured application 660 in the field, the security framework requires that the user negotiate a security token 670 with an authentication server 680 before the application may be used. The security token 670 may, for example, be negotiated by providing the authentication server 680 with valid identification information, such as a username and password. In other embodiments, however, additional information could also be required to receive a security token. For instance, in one example, the security framework may provide the authentication server 680 with the version number of the secured application 620, and the authentication server 680 may verify that a valid version of the software 620 is installed prior granting access. In this way, the compliance monitoring authority 640 can verify that the correct version of software is in place and is secure before allowing the software to be used in the field. In the example of a regulated medical device, the compliance monitoring authority 640 may verify that a compliant version of the software 620 is installed and secured before allowing the device 630 to be used on a patient. In this way, the use of medical-related or other regulated software may be controlled from a remote central location.

In addition to the example illustrated in FIG. 6, the security framework described herein may be advantageous for many applications and in many industries where it is desired to provide secure applications and secure data transmission. For instance, in one example, the mobile security framework may be used to ensure the confidentiality of patient data in a mobile application used by a treating physician or other medical personnel.

In another example, the mobile security frame work may be utilized to secure communications between two or more computing devices, such as a server and mobile computing device utilized by a salesperson. Utilizing the mobile security framework in this manner may ensure that the salesperson's mobile computing device contains the most up to date information. Additionally, by serving the information from a secure location, the content of the information can be tailored to the salespersons audience, for instance by providing audience-specific information with the security token.

The security framework described herein also provides enhanced security features by encrypting any information that is added to the mobile computing device by a user, therefore, if the user's mobile computing device is lost or stolen, the information contained thereon cannot be accessed.

With the increased use of portable computing devices by consumers, manufacturers have responded by making applications available for users to install on their portable computing devices. These applications can assist the user to track such things as weight, exercise time, food intake, glucose measurements and the like. The FDA has published a set of guidelines asking the general public how these applications should be regulated by the FDA to ensure consumer safety. For example, if the application is utilized to measure and track glucose readings and then make insulin or food recommendations to a user, there is concern if the application does not perform the correct calculations the user may suffer harm. By utilizing the security framework, as described herein, to develop a glucose measuring and insulin calculating application, a user of the application would be required to log into the application via an authentication server. Through the login process, the developer of the application can ensure that the application installed on the user's device is up to date and is functioning properly. In the event of a recall or other action required by the FDA, the functionality of the application can be terminated by the developer, thereby ensuring that the application can no longer be used and averting any harm to the user. Alternatively, the application could be automatically updated on the users device to ensure that the application is up to date and functioning properly.

Figure 7:
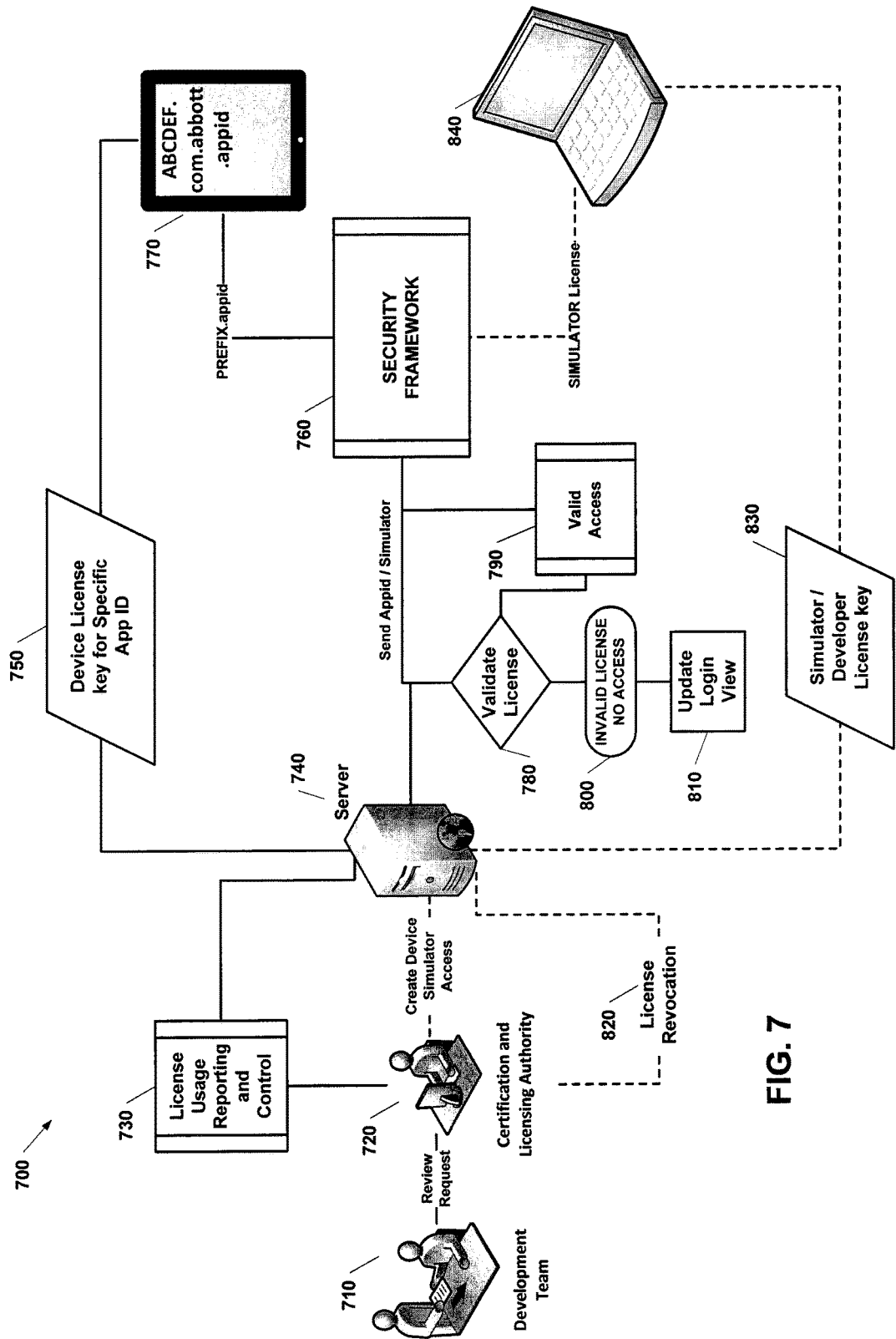
FIG. 7 is a diagram depicting another example system for verifying proper installation of a security framework and certifying a secured application for operation.

FIG. 7 is a diagram depicting another example system 700 for verifying proper installation of a security framework and certifying a secured application for operation. In this example 700 a digital license is utilized to verify and control access to a secured application. The digital license may, for example, be used in addition to the security token described above to provide added security and control over the secured application, or, in other examples, may be used in place of a security token.

In the illustrated example 700, an application development team 710 submits a certification and licensing request to a certification and licensing authority 720 for review and approval. For instance, similar to the example described above with reference to FIG. 3, the certification, and licensing authority 720 may be responsible for verification, testing and installation of a device security configuration profile into an application provided by the development team 710. In addition, upon approval of the application for use by a particular user, the certification and licensing authority 720 is also responsible for generating and controlling a digital license that enables access to the secured application on a particular device, as illustrated at step 730. The digital license is provided to the authentication server 740, which creates an application and device specific license key 750 that is added to the application security framework 760. In addition, the authentication server 740 may also generate an application ID 770 that is linked to the license key and added to the security framework 760 along with the license key 750. The application ID 770 may, for example, be used to identify the license information stored within the authentication server 740. An example format for an application ID is illustrated at 770.

The application license key, which is created and managed in the authentication server 740, may be a universally unique identifier (UUID) that is linked to a unique application ID. The application ID may include a unique string identifying the secured application 760. The combination of the application ID and license key may thus be used to provide a unique mapping combination for the authentication server.

When the secured application is launched, the security framework 760 accesses the authentication server 740 to validate the license key before access to the application is permitted. As example method for validating the license key is illustrated in FIG. 7. At step 780, the security framework 760 accesses the authentication server 740 to validate a stored license key. The security framework 760 may, for example, transmit a copy of the license key 750 and application ID 770 to the authentication server 740, which compares the received key and application ID with stored license data 730 to verify that the key is valid. For instance, the application ID 770 may be used by the authentication server 740 to identify stored licensing data 730 that is associated with the particular application and device, and the received copy of the license key 750 may then be compared to the stored licensing data 730 to determine if the key is authentic and active. If the key is validated by the authentication server 740, then the security framework 760 allows access to the secured application, as shown at step 790. Otherwise, if the authentication server 740 fails to validate the license key, the access to the secured application is denied by the security framework 760 (step 800), and an application interface may default to an update login view (step 810.)

As illustrated in FIG. 7, the authentication server 740 may also be used to revoke an application license, preventing further access to a secured application stored on a remote device. For instance, the certification and licensing authority 720 may send a revocation instruction 820 to the authentication server 740 indicating that a particular license has been revoked. Then, when an attempt is made to access the application on a remote device, the license validation procedure (780-810) performed between the security framework 760 and the authentication server 740 will cause access to the application to be denied at step 800.

Also illustrated in FIG. 7 is a simulator or developer license key 830 that may be used to provide access to a secured application during a testing or development phase. For instance, a simulator or developer license key and application ID 830 may be generated for installation on a device 840 to enable application access on the device 840 during the development or testing of the application and security framework. The simulator or developer key 830 may, for example be removed after product development or testing is completed or may be disabled by providing a disable instruction 820 to the authentication server 740.

Figure 8:
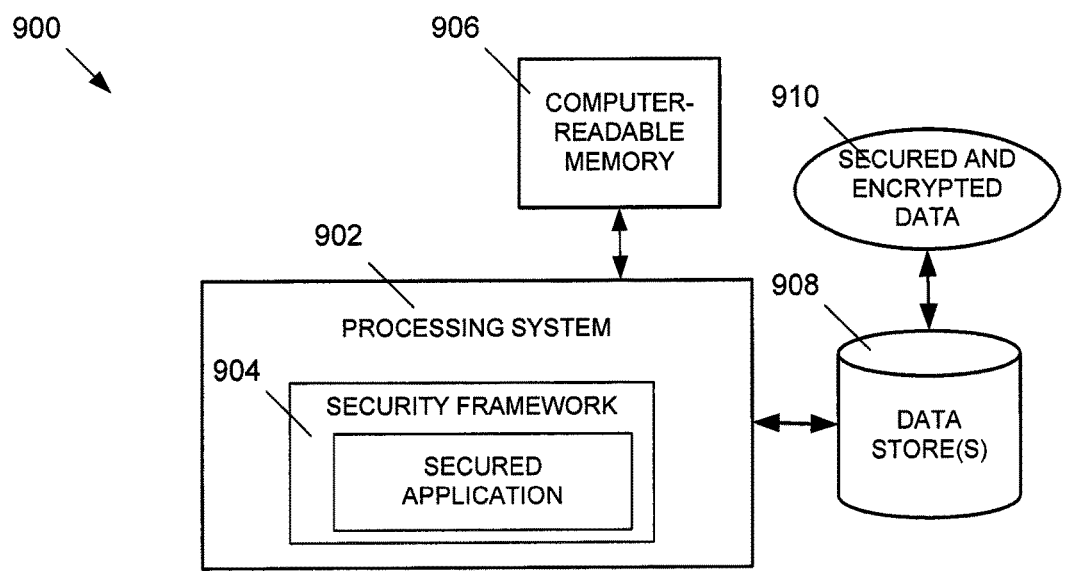
FIG. 8 depicts an example system that may include a secured application.

FIG. 8 depicts an example system that may include a secured application, as described herein. FIG. 8 depicts an exemplary system 800 that includes a standalone computer architecture where a processing system 802 (e.g., one or more computer processors located in a given computing device or in multiple computing devices that may be separate and distinct from one another) includes a secured application 904 being executed on it. The processing system 902 has access to a computer-readable memory 906 in addition to one or more data stores 908. The one or more data stores 908 may include secured and encrypted data, for instance as described above with reference to FIG. 4.

This written description uses examples to disclose the invention, including the best mode, and also to enable a person skilled in the art to make and use the invention. The patentable scope of the invention may include other examples that occur to those skilled in the art.

It is noted that the systems and methods described herein may be implemented on various types of computer architectures. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.) It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operations and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method for providing secure access to a software application on a computing device, the method comprising:
   executing the software application, including a security framework having a set of predetermined security requirements, on the computing device, wherein the security framework and the set of predetermined security requirements are generated using at least one of i) a preapproved security framework template or ii) a preapproved security framework template and a set of security modules installed on the computing device from a security framework library;
   verifying, by the security framework, installation of a device security configuration profile on the computing device prior to enabling access to the software application by a user, wherein the device security configuration profile includes a certification that the software application includes the set of predetermined security requirements, wherein the device security configuration profile is installed by a certification authority, wherein the device security configuration profile provides a set of predetermined security restrictions corresponding to the set of predetermined security requirements, and wherein the verifying of the installation further includes verifying that the device security configuration profile is stored at an appropriate secure location of the computing device;
   providing access to the software application on the computing device for a specified period; and
   continuously monitoring the set of predetermined security restrictions included within the device security configuration profile until the set of predetermined security restrictions is altered or disabled, and disabling access to the software application on the computing device when any one of the set of predetermined security restrictions included within the device security configuration profile is altered or disabled.

2. The method of claim 1, wherein the device security configuration profile is installed on the computing device by the certification authority based, at least in part, on a determination by the certification authority that the software application installed on the computing device includes the set of predetermined security requirements and satisfies one or more security guidelines or tests.

3. The method of claim 1, wherein the set of predetermined security requirements includes (i) user authentication to restrict access to the software application, (ii) data encryption to protect stored data and data communications associated with the software application, and (iii) restrictions on access to online content.

4. The method of claim 3, wherein access to the software application is terminated based upon the user authentication.

5. The method of claim 1, wherein the set of security modules is configured for installation in a plurality of types of computing devices.

6. The method of claim 1, wherein the set of security modules includes application programming interfaces (APIs) that are configured to enable use of the set of security modules with a plurality of types of software applications.

7. The method of claim 1, further comprising:
   prior to enabling access to the software application, storing a licensing key on the computing device, and validating the licensing key with an authentication server;
   wherein access to the software application is conditioned upon a successful validation of the licensing key.

8. The method of claim 7, further comprising:
receiving an instruction to revoke the licensing key; and
in response to the instruction, disabling access to the software application.

9. The method of claim 1, wherein the software application is an application selected from the group consisting of a glucose measurement application, a sales training tool, an inventory management application, an application used to track a user's compliance to prescription compliance, an application that reminds the user to take medication, an application to view x-rays, an application to view ultrasounds, an application to view CT images, an application to view MR images, an application to assist a health care provider to prescribe medication, an application to calculate medical formulations based on a patient's parameters, a pregnancy tracking application, a nutritional supplement tracking application, a baby formula tracking application, an electrocardiogram application, and a sleep apnea tracking application.

10. The method of claim 1, wherein the device security configuration profile provides predetermined security restrictions that regulate access to a user interface of the computing device by the user.

11. The method of claim 10, wherein the predetermined security restrictions include (i) password protection to restrict the access to the user interface, and (ii) a screen lock feature to restrict the access to the user interface.

12. The method of claim 1, wherein the verifying of the installation of the device security configuration profile includes:
verifying that the device security configuration profile includes a valid digital signature from the certification authority, the device security configuration profile being installed on the computing device by the certification authority based on a determination by the certification authority that the software application (i) includes the set of predetermined security requirements, and (ii) satisfies one or more security guidelines or tests; and
verifying that an expiration period for the device security configuration profile has not expired.

13. An application security system for a computing device, comprising;
one or more processors;
a non-transitory computer readable medium; and
a software application stored in the computer readable medium and executable by the one or more processor, the software application including a security framework having a set of predetermined security requirements, wherein the security framework and the set of predetermined security requirements are generated using at least one of i) a preapproved security framework template or ii) a preapproved security framework template and a set of security modules installed on the computing device from a security framework library, wherein the security framework is configured to:
verify installation of a device security configuration profile on the computing device prior to enabling access to the software application by a user, wherein the device security configuration profile includes a certification that the software application includes the set of predetermined security requirements, wherein the device security configuration profile is installed by a certification authority, wherein the device security configuration profile provides a set of predetermined security restrictions corresponding to the set of predetermined security requirements, and wherein the verifying of the installation further includes verifying that the device security configuration profile is stored at an appropriate secure location of the computing device;
provide access to the software application on the computing device for a specified period; and
continuously monitor the set of predetermined security restrictions included within the device security configuration profile until the set of predetermined security restrictions is altered or disabled, and disable access to the software application when any one of the set of predetermined security restrictions included within the device security configuration profile is altered or disabled.

14. The system of claim 13, wherein the device security configuration profile is installed on the computing device by the certification authority based, at least in part, on a determination by the certification authority that the software application installed on the computing device includes the set of predetermined security requirements and satisfies one or more security guidelines or tests.

15. The system of claim 13, wherein the set of predetermined security requirements includes (i) user authentication to restrict access to the software application, (ii) data encryption to protect stored data and data communications associated with the software application, and (iii) restrictions on access to online content.

16. The system of claim 15, wherein access to the software application is terminated based upon the user authentication.

17. The system of claim 13, wherein the set of security modules is configured for installation in a plurality of types of computing devices.

18. The system of claim 13, wherein the set of security modules includes application programming interfaces (APIs) that are configured to enable use of the set of security modules with a plurality of types of software applications.

19. The system of claim 13, wherein the security framework is further configured to:
prior to enabling access to the software application, store a licensing key on the computing device, and validate the licensing key with an authentication server;
wherein access to the software application is conditioned upon a successful validation of the licensing key.

20. The system of claim 19, wherein the security framework is further configured to:
receive an instruction to revoke the licensing key; and
in response to the instruction, disable access to the software application.

21. The system of claim 13, wherein the software application is an application selected from the group consisting of a glucose measurement application, a sales training tool, an inventory management application, an application used to track a user's compliance to prescription compliance, an application that reminds the user to take medication, an application to view x-rays, an application to view ultrasounds, an application to view CT images, an application to view MR images, an application to assist a health care provider to prescribe medication, an application to calculate medical formulations based on a patient's parameters, a pregnancy tracking application, a nutritional supplement tracking application, a baby formula tracking application, an electrocardiogram application, and a sleep apnea tracking application.

22. The system of claim 13, wherein the computing device is configured to be coupled with an external display, and wherein the security framework prevents password information from being displayed on the external display.

23. The system of claim 13, wherein a security token is configured to provide access to a plurality of software applications, each of the plurality of software applications including the security framework.

24. The system of claim 13, wherein the security framework is configured to store offline data and, upon obtaining network access, communicate with a server to verify credentials for the stored offline data.

* * * * *

UNITED STATES PATENT AND TRADEMARK OFFICE
CERTIFICATE OF CORRECTION

PATENT NO. : 9,824,194 B2
APPLICATION NO. : 14/751779
DATED : November 21, 2017
INVENTOR(S) : Balasubramanian Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 118 days.

Signed and Sealed this
Twenty-third Day of April, 2019

Andrei Iancu
*Director of the United States Patent and Trademark Office*